(12) United States Patent
Lee et al.

(10) Patent No.: US 11,937,641 B2
(45) Date of Patent: Mar. 26, 2024

(54) HEATER ASSEMBLY FOR HEATING CIGARETTE, AND AEROSOL GENERATION DEVICE INCLUDING SAME

(71) Applicant: KT&G CORPORATION, Daejeon (KR)

(72) Inventors: Seung Won Lee, Gwangmyeong-si (KR); Sang Kyu Park, Hwaseong-si (KR); Jae Min Lee, Siheung-si (KR)

(73) Assignee: KT&G CORPORATION, Daejeon (KR)

( * ) Notice: Subject to any disclaimer, the term of this patent is extended or adjusted under 35 U.S.C. 154(b) by 888 days.

(21) Appl. No.: 16/971,876

(22) PCT Filed: Nov. 7, 2019

(86) PCT No.: PCT/KR2019/015072
§ 371 (c)(1),
(2) Date: Aug. 21, 2020

(87) PCT Pub. No.: WO2020/116798
PCT Pub. Date: Jun. 11, 2020

(65) Prior Publication Data
US 2021/0084980 A1 Mar. 25, 2021

(30) Foreign Application Priority Data
Dec. 7, 2018 (KR) .......................... 10-2018-0157474

(51) Int. Cl.
*A24F 40/465* (2020.01)
(52) U.S. Cl.
CPC .................................. *A24F 40/465* (2020.01)

(58) Field of Classification Search
CPC ...................................................... A24F 40/465
See application file for complete search history.

(56) References Cited

U.S. PATENT DOCUMENTS

| 10,028,533 | B2 | 7/2018 | Fursa et al. |
| 10,219,543 | B2 | 3/2019 | Gill et al. |
| 10,631,574 | B2 * | 4/2020 | Bleloch .................. A24F 40/44 |
| 10,791,765 | B2 | 10/2020 | Li et al. |

(Continued)

FOREIGN PATENT DOCUMENTS

| CN | 104664608 A | 6/2015 |
| CN | 204949521 U | 1/2016 |

(Continued)

OTHER PUBLICATIONS https://en.wikipedia.org/wiki/Pulse-width_modulation, retrieved Aug. 3, 2023.*

(Continued)

*Primary Examiner* — Ross N Gushi
(74) *Attorney, Agent, or Firm* — Sughrue Mion, PLLC

(57) ABSTRACT

A heater assembly for heating a cigarette accommodated in an aerosol generating device includes a heating element that extends in a longitudinal direction of the cigarette and includes a ferromagnetic substance for generating heat by an external magnetic field, and a temperature sensor that measures a temperature of the heating element. The heater assembly is disposed at an inner end portion of an accommodation space provided in the aerosol generating device to accommodate the cigarette.

14 Claims, 8 Drawing Sheets

(56) References Cited

U.S. PATENT DOCUMENTS

| | | | |
|---|---|---|---|
| 11,000,073 | B2 | 5/2021 | Hu et al. |
| 11,234,457 | B2 | 2/2022 | Mironov et al. |
| 11,382,358 | B2 * | 7/2022 | Batista .................. A24F 40/465 |
| 2016/0374397 | A1 | 12/2016 | Jordan et al. |
| 2017/0055580 | A1* | 3/2017 | Blandino ............... H05B 6/108 |
| 2017/0055585 | A1 | 3/2017 | Fursa et al. |
| 2017/0055587 | A1 | 3/2017 | Zinovik et al. |
| 2017/0079326 | A1 | 3/2017 | Mironov |
| 2017/0119048 | A1 | 5/2017 | Kaufman et al. |
| 2018/0020732 | A1 | 1/2018 | Kozlowski et al. |
| 2018/0125119 | A1 | 5/2018 | Cadieux et al. |
| 2018/0310622 | A1 | 11/2018 | Mironov et al. |
| 2018/0325179 | A1 | 11/2018 | Li et al. |
| 2019/0320720 | A1 | 10/2019 | Mironov et al. |
| 2019/0380390 | A1 | 12/2019 | Jeong et al. |
| 2020/0054068 | A1 | 2/2020 | Blandino et al. |
| 2020/0077715 | A1 | 3/2020 | Mironov |

FOREIGN PATENT DOCUMENTS

| | | |
|---|---|---|
| CN | 105307524 A | 2/2016 |
| CN | 206808677 U | 12/2017 |
| CN | 207040896 U | 2/2018 |
| CN | 107920599 A | 4/2018 |
| CN | 108135266 A | 6/2018 |
| CN | 108347999 A | 7/2018 |
| CN | 207754542 U | 8/2018 |
| CN | 108617042 A | 10/2018 |
| CN | 207968988 U | 10/2018 |
| KR | 10-2015-0143891 A | 12/2015 |
| KR | 10-1667177 B1 | 10/2016 |
| KR | 10-2017-0007235 A | 1/2017 |
| KR | 10-2017-0110566 A | 10/2017 |
| KR | 10-2018-0033295 A | 4/2018 |
| KR | 10-2018-0069895 A | 6/2018 |
| KR | 10-2018-0085369 A | 7/2018 |
| RU | 2665613 C1 | 8/2018 |
| WO | 2018/195335 A1 | 10/2018 |

OTHER PUBLICATIONS

International search report for PCT/KR2019/015072 dated Feb. 17, 2020.

Korean Written Opinion for PCT/KR2019/015072 dated Feb. 17, 2020.

Communication dated May 18, 2021 by the Japanese Patent Office in application No. 2020-533571.

Chinese Office Action dated Dec. 5, 2022 in Chinese Application No. 201980017111.4.

Communication dated Jan. 19, 2021, in corresponding Korean Application No. 10-2018-0157474.

Extended European Search Report dated Dec. 13, 2021 in European Application No. 19893146.1.

Office Action dated Dec. 28, 2021 in Russian Application No. 2021113561.

* cited by examiner

HEATER ASSEMBLY FOR HEATING CIGARETTE, AND AEROSOL GENERATION DEVICE INCLUDING SAME

CROSS-REFERENCE TO RELATED APPLICATIONS

This application is a National Stage of International Application No. PCT/KR2019/015072 filed on Nov. 7, 2019, which claims priority under U.S.C. § 119(a) to Korean Patent Application No. 10-2018-0157474 filed on Dec. 7, 2018.

TECHNICAL FIELD

The present disclosure relates to a heater assembly for heating a cigarette and an aerosol generating device including the same. More specifically, the present disclosure relates to a heater assembly including a ferromagnetic substance for generating heat by an external magnetic field and an aerosol generating device that applies an alternating magnetic field to the heater assembly.

BACKGROUND ART

In recent years, the demand for alternative methods of overcoming shortcomings of general cigarettes has increased. For example, there is growing demand for a method of generating aerosol by heating a tobacco material in a cigarette, rather than by combusting a cigarette. Accordingly, research into a heating-type cigarette and a heating-type aerosol generating device is actively being conducted.

An alternative heating method has been proposed to replace a method of heating a cigarette by disposing a heater formed of an electric resistor inside or outside a cigarette accommodated in an aerosol generating device and by supplying power to the heater. In particular, research is being conducted into an induction heating method of generating aerosol by including a magnetic substance that generates heat by an external magnetic field and supplying a current to a coil included in the aerosol generating device to apply a magnetic field to the cigarette.

If a magnetic substance for generating heat by receiving a magnetic field is included in the cigarette, it may be difficult to directly measure a temperature of the magnetic substance that heats a cigarette, and thus, it may be difficult to control the temperature of the magnetic substance. In addition, if a magnetic substance is not uniformly distributed in the cigarette in a process of making the cigarette, the aerosol may be generated non-uniformly from the cigarette.

In order to resolve concerns that aerosol is generated non-uniformly and to improve quality of the aerosol generated from a cigarette by controlling a temperature of a magnetic substance more precisely, it may be required to improve a structure of a magnetic substance for heating a cigarette using an induction heating method.

DESCRIPTION OF EMBODIMENTS

Technical Problem

Various embodiments are directed to provide a heater assembly for heating a cigarette and an aerosol generating device including the same. Technical problem to be solved by the present disclosure are not limited to the technical problems described above, and other technical problems may be inferred from the following embodiments.

Solution to Problem

According to an aspect of the present disclosure to solve the technical problems described above, a heater assembly for heating a cigarette accommodated in an aerosol generating device includes a heating element that extends in a longitudinal direction of the cigarette and includes a ferromagnetic substance for generating heat by an external magnetic field; and a temperature sensor that measures a temperature of the heating element. The heater assembly is disposed at an inner end portion of an accommodation space provided in the aerosol generating device to accommodate the cigarette.

According to another aspect of the present disclosure, an aerosol generating device including a heater assembly includes the heater assembly; the accommodation space; a coil that applies an alternating magnetic field to the heating element; a power supply unit that supplies power to the coil; and a controller that controls the power supplied to the coil.

Advantageous Effects of Disclosure

As a temperature sensor included in a heater assembly according to the present disclosure is included in the heater assembly and is disposed at a position in direct contact with an inner surface of a heating element for generating heat by receiving an external magnetic field, a temperature of the heater assembly heating a cigarette using an induction heating method may be directly measured and provided to an aerosol generating device, and thus, the temperature of the heater assembly for heating the cigarette may be more precisely controlled.

As a heating element including a ferromagnetic substance for generating heat by receiving an external magnetic field is disposed inside an aerosol generating device, not inside the cigarette, a problem that a magnetic substance is non-uniformly distributed when the magnetic substance is included in the cigarette may be solved is included in the cigarette, and aerosol may be generated more uniformly.

BEST MODE

According to an aspect of the present disclosure, a heater assembly for heating a cigarette accommodated in an aerosol generating device may include a heating element that extends in a longitudinal direction of the cigarette and includes a ferromagnetic substance for generating heat by an external magnetic field; and a temperature sensor that measures a temperature of the heating element. The heater assembly may be disposed at an inner end portion of an accommodation space provided in the aerosol generating device to accommodate the cigarette.

MODE OF DISCLOSURE

Hereinafter, example embodiments will be described in detail with reference to the accompanying drawings. It should be understood that the following description is only for the purpose of embodying the embodiments and does not limit the scope of the disclosure. It should be construed that what may be easily inferred by experts in the art from the detailed description and embodiments belongs to the scope of the present disclosure.

Terms "configure", "include", and so on used in the present specification should not be construed as including all the various configuration elements or various steps described in the specification, and some of the configuration elements or steps may not be included, or additional configuration elements or steps may be further included.

Terms including an ordinal number such as "first" or "second" used in the present specification may be used to describe various configuration elements, but the configuration elements should not be limited by the terms. The terms are used only to distinguish one configuration element from other configuration elements.

With respect to the terms used in the present specification, general terms which are currently used as widely as possible are selected in consideration of functions of structural elements in the various embodiments of the present disclosure. However, meanings of the terms may be changed according to intention, a judicial precedence, the appearance of new technology, and the like. In addition, in a certain case, some terms are randomly selected by the applicant, and in this case, meanings thereof will be described in detail in the description of the corresponding disclosure. Accordingly, the terms used in the present disclosure should be defined based on the meanings of the terms and the content of the present disclosure, not simply by the names of the terms.

The present embodiments relate to a heater assembly for heating a cigarette and an aerosol generating device including the same, and detailed descriptions on matters well known to those skilled in the art to which the following embodiments belong will be omitted.

Figure 1:
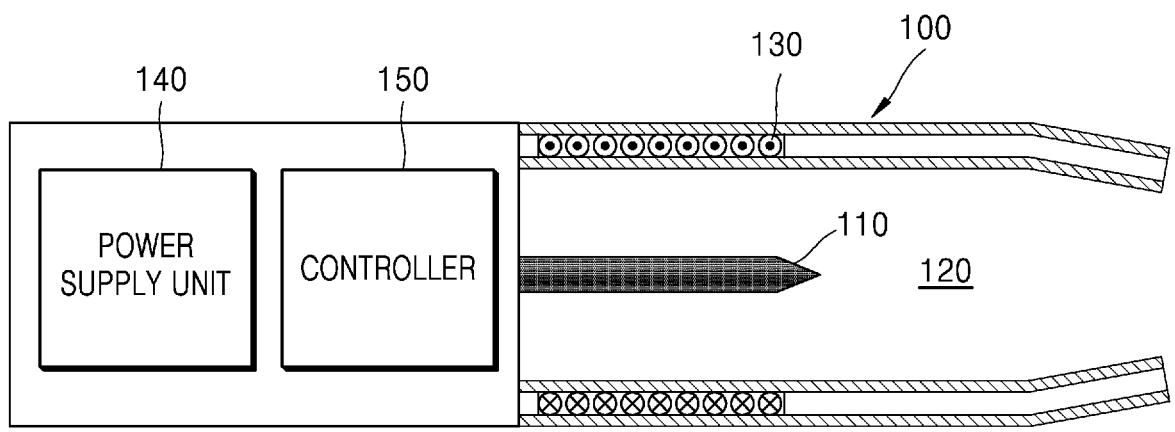
FIG. 1 is a view illustrating elements constituting an aerosol generating device including a heater assembly according to an embodiment.

FIG. 1 is a view illustrating elements constituting an aerosol generating device including a heater assembly according to an embodiment.

Referring to FIG. 1, an aerosol generating device 100 may include a heater assembly 110, an accommodation space 120, a coil 130, a power supply unit 140, and a controller 150. However, the aerosol generating device 100 is not limited thereto and may further include other general-purpose elements in addition to the elements illustrated in FIG. 1.

The aerosol generating device 100 may generate aerosol by heating a cigarette accommodated in the aerosol generating device 100 by using an induction heating method. The induction heating method may include a method of generating heat from a magnetic substance by applying an alternating magnetic field of which direction is periodically changed to a magnetic substance that generates heat by receiving an external magnetic field.

When an alternating magnetic field is applied to a magnetic substance, energy loss may occur in the magnetic substance due to eddy current loss and hysteresis loss, and the lost energy may be released from the magnetic substance as thermal energy. As the amplitude or frequency of the alternating magnetic field applied to the magnetic substance increases, the heat energy released from the magnetic substance also increases. The aerosol generating device 100 may release heat energy from a magnetic substance by applying an alternating magnetic field to the magnetic substance and may transfer the heat energy emitted from the magnetic substance to a cigarette.

A magnetic substance that generates heat by receiving an external magnetic field may be a susceptor. The susceptor may be disposed in the aerosol generating device 100 instead of being included in the cigarette in the form of a chip, a slice, or a strip. For example, the susceptor may be included in the heater assembly 110 disposed inside the aerosol generating device 100.

The susceptor may include metal or carbon. The susceptor may include at least one of ferrite, ferromagnetic alloy, stainless steel, and aluminum (Al). In addition, the susceptor may also include at least one of graphite, molybdenum, silicon carbide, niobium, nickel alloy, metal film, ceramic such as zirconia, transition metal such as nickel (Ni) or cobalt (Co), and metalloid such as boron (B) or phosphorus (P).

The aerosol generating device 100 may include the accommodation space 120 for accommodating a cigarette. The accommodation space 120 may include an opening that opens to the outside of the accommodation space 120 to accommodate a cigarette in the aerosol generating device 100. A cigarette may be accommodated in the aerosol generating device 100 in a direction from the outside of the accommodation space 120 to the inside of the accommodation space 120 through the opening of the accommodation space 120.

The heater assembly 110 may be disposed at an inner end portion of the accommodation space 120. The heater assembly 110 may be attached to a bottom surface formed at the inner end portion of the accommodation space 120. An upper end portion of the heater assembly 110 may be inserted into a cigarette, and the cigarette may reach a bottom surface of the accommodation space 120.

The aerosol generating device 100 may include the coil 130 that applies an alternating magnetic field to the heater assembly 110. The coil 130 may be wound around a side surface of the accommodation space 120 and may be disposed at a position corresponding to the heater assembly 110. The coil 130 may receive power from the power supply unit 140.

When power is supplied to the coil 130, a magnetic field may be formed inside the coil 130. When an AC current is applied from the power supply unit 140 to the coil 130, the magnetic field formed in the coil 130 may periodically change in direction. When the heater assembly 110 formed inside the coil 130 is exposed to an alternating magnetic field that periodically changes a direction, the heater assembly 110 generates heat, thus heating a cigarette accommodated in the aerosol generating device 100.

When an amplitude or frequency of the alternating magnetic field formed by the coil 130 changes, a temperature of the heater assembly 110 that heats the cigarette may also change. The controller 150 may adjust the amplitude or frequency of the alternating magnetic field formed by the coil 130 by controlling power supplied to the coil 130, and thus, the temperature of the heater assembly 110 may be controlled.

For example, the coil 130 may be configured with a solenoid. The coil 130 may be a solenoid wound along a side surface of the accommodation space 120, and a cigarette 200 may be accommodated in the inner space of the solenoid. A material of a conducting wire constituting the solenoid may be copper (Cu). However, the material of the conducting wire is not limited thereto and may be a material with a low specific resistance value allowing a large current to flow. For example, any one of silver (Ag), gold (Au), aluminum (Al), tungsten (W), zinc (Zn), and nickel (Ni) or an alloy containing at least one thereof may be the material of the conducting wire constituting the solenoid.

According to an embodiment, the susceptor may be included in the heater assembly 110 provided in the aerosol generating device 100 instead of being included in a cigarette. In this case, there may be various advantages as compared with a case in which the susceptor is included in the cigarette. For example, a problem that aerosol and flavor are generated non-uniformly when a material of the susceptor is not uniformly distributed inside the cigarette may be solved. In addition, since the heater assembly 110 including the susceptor is provided in the aerosol generating device 100, a temperature of the heater assembly 110 that generates heat by induction heating may be directly measured and provided to the aerosol generating device 100. Accordingly, the temperature of the heater assembly 110 may be controlled precisely.

Figure 2:
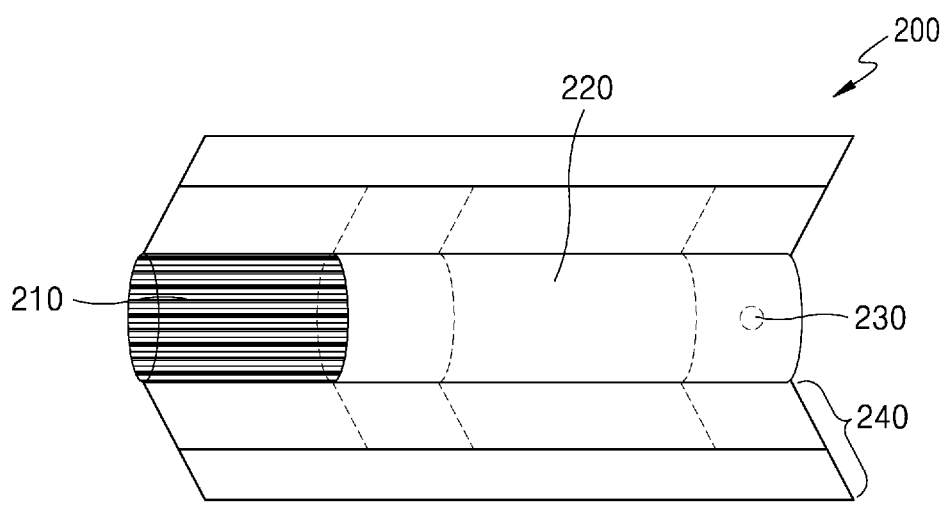
FIG. 2 is a view illustrating a cigarette that generates aerosol when heated by a heater assembly, according to an embodiment.

FIG. 2 is a view illustrating a cigarette that is heated by a heater assembly and generates aerosol, according to an embodiment.

Referring to FIG. 2, the cigarette 200 may include a tobacco rod 210 and a filter rod 220. The filter rod 220 is illustrated as being composed of a single segment in FIG. 2, but is not limited thereto and may be composed of a plurality of segments. For example, the filter rod 220 may include a first segment for cooling aerosol and a second segment for filtering a specific component included in the aerosol. In addition, the filter rod 220 may further include at least one segment that performs other functions.

The cigarette 200 may be wrapped by at least one wrapper 240. The wrapper 240 may include at least one hole through which external air flows in or internal air flows out. The cigarette 200 may be wrapped by one wrapper 240. As another example, the cigarette 200 may be wrapped by two or more wrappers 240 in an overlapping manner. Specifically, the tobacco rod 210 may be wrapped by a first wrapper, and the filter rod 220 may be wrapped by a second wrapper. The tobacco rod 210 and the filter rod 220 respectively wrapped by the wrappers are coupled to each other, and then the entire cigarette 200 may be rewrapped by a third wrapper.

The tobacco rod 210 may include an aerosol generating material. For example, the aerosol generating material may contain at least one of glycerin, propylene glycol, ethylene glycol, dipropylene glycol, diethylene glycol, triethylene glycol, tetraethylene glycol, and oleyl alcohol, but is not limited thereto. The tobacco rod 210 may contain other additives such as a savoring agent, a wetting agent and/or organic acid. A flavored liquid such as menthol or moisturizer may be sprayed to the tobacco rod 210 to be added thereto.

The tobacco rod 210 may be made in various ways. For example, the tobacco rod 210 may be made of sheets or strands. Alternatively, the tobacco rod 210 may also be made of cut tobacco obtained by finely cutting a tobacco sheet.

The tobacco rod 210 may be surrounded by a heat-conducting material. For example, the heat-conducting material may be metal foil such as aluminum foil, but is not limited thereto. The heat-conducting material surrounding the tobacco rod 210 may evenly dissipate the heat transferred to the tobacco rod 210 to increase thermal conductivity of the tobacco rod 210, thereby improving the savor of aerosol generated from the tobacco rod 210.

The filter rod 220 may be a cellulose acetate filter. The filter rod 220 may have various forms. For example, the filter rod 220 may be a cylindrical rod, or a tubular rod including a hollow therein. Alternatively, the filter rod 220 may also be a recessed rod including a cavity therein. When the filter rod 220 is composed of a plurality of segments, the plurality of segments may have different shapes.

The filter rod 220 may be made to generate flavor. For example, a flavored liquid may be sprayed onto the filter rod 220, or fibers coated with a flavored liquid may be inserted into the filter rod 220.

The filter rod 220 may include at least one capsule 230. The capsule 230 may generate flavor or aerosol. For example, the capsule 230 may be formed in a structure that includes a flavor-containing liquid wrapped with a film. The capsule 230 may have a spherical or cylindrical shape, but is not limited thereto.

When a cooling segment for cooling aerosol is included in the filter rod 220, the cooling segment may be made of a polymer material or a biodegradable polymer material. For example, the cooling segment may be made of pure polylactic acid only. Alternatively, the cooling segment may be made of a cellulose acetate filter including a plurality of perforations. However, the cooling segment is not limited thereto, and may be composed of other structures and materials capable of cooling aerosol.

Figure 3:
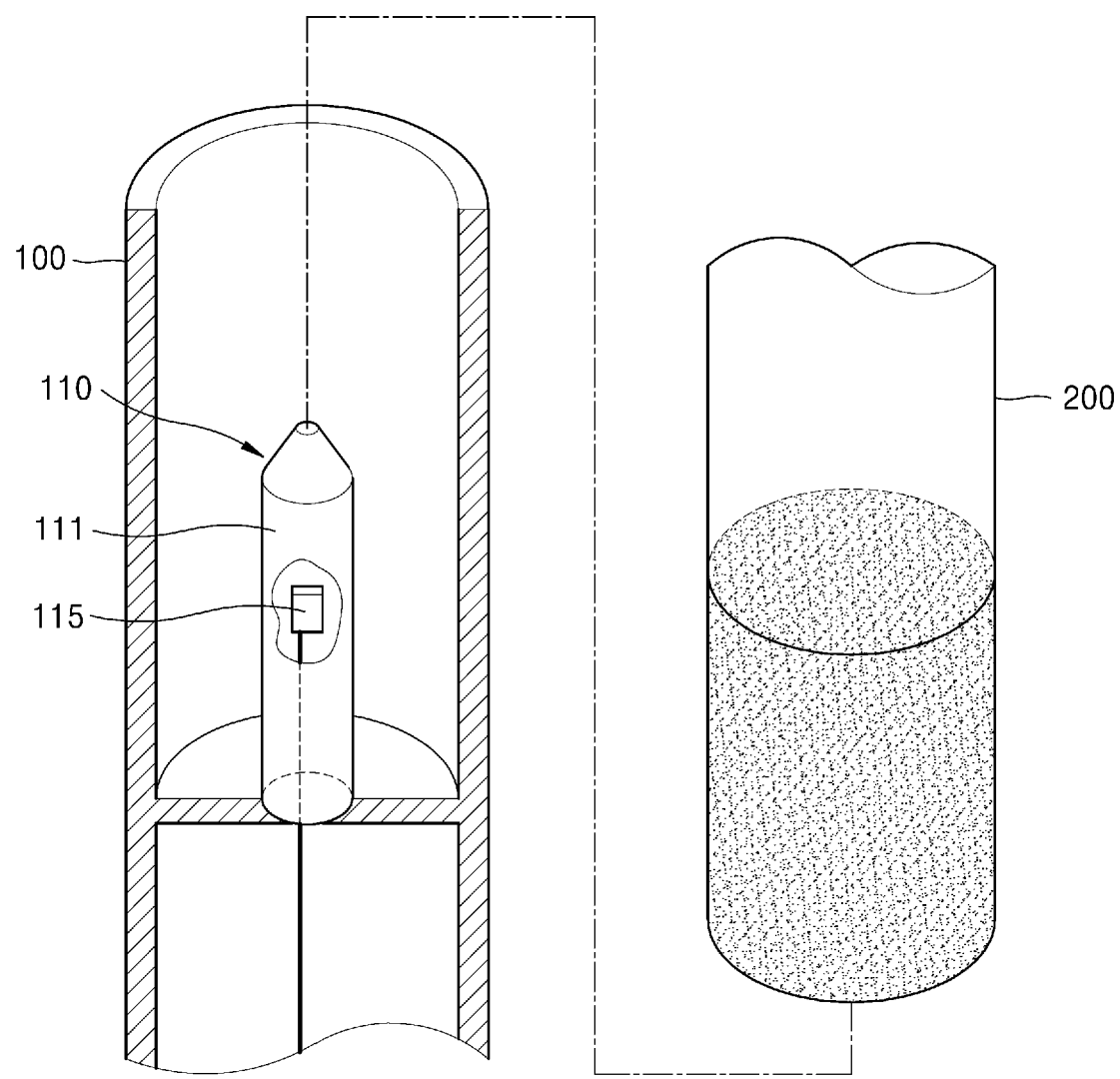
FIG. 3 is a view illustrating a heater assembly for heating a cigarette accommodated in an aerosol generating device according to an embodiment.

FIG. 3 is a view illustrating a heater assembly that heats a cigarette accommodated in an aerosol generating device according to an embodiment.

FIG. 3 illustrates the heater assembly 110 that heats the cigarette 200 accommodated in the aerosol generating device 100. However, the aerosol generating device 100, the cigarette 200, and the heater assembly 110 illustrated in FIG. 3 are merely examples, and the aerosol generating device 100 and the heater assembly 110 may be arranged to form other structures capable of heating the cigarette 200.

The cigarette 200 may be accommodated in the aerosol generating device 100 in a longitudinal direction of the cigarette 200. The heater assembly 110 may be inserted into the cigarette 200 accommodated in the aerosol generating device 100. The heater assembly 110 may have a structure extending in the longitudinal direction to be inserted into the cigarette 200.

The heater assembly 110 may be located at a central portion of the accommodation space 120 to be inserted into a central portion of the cigarette 200. In FIG. 3, the heater assembly 110 is illustrated as being a single number but is not limited thereto, and the heater assembly 110 may be composed of a plurality of heater assemblies that extend in the longitudinal direction to be inserted into the cigarette 200 and are disposed in parallel to each other.

Figure 4:
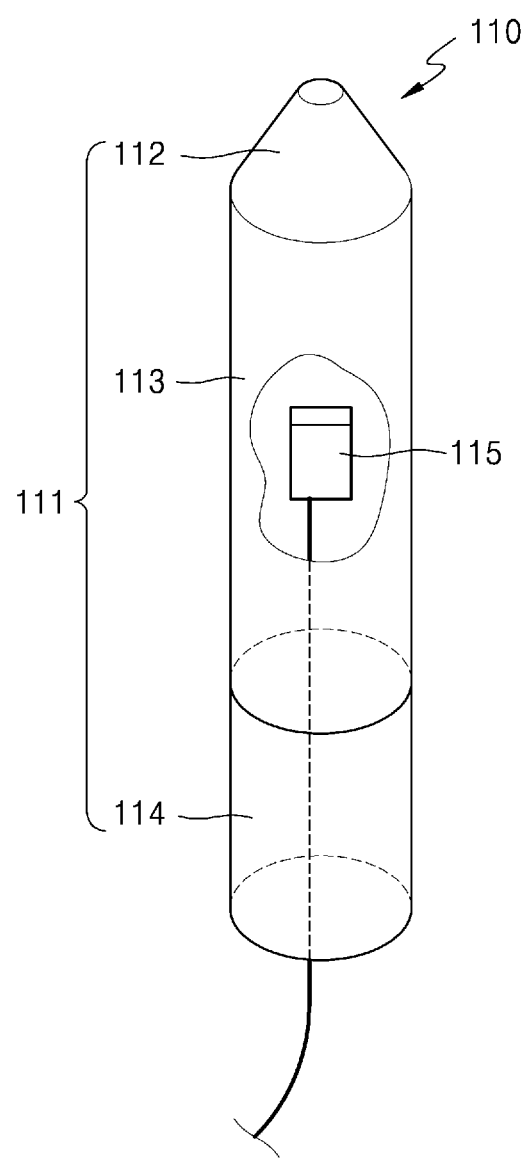
FIG. 4 is a view illustrating elements constituting a heater assembly according to an embodiment.

FIG. 4 is a view illustrating elements constituting a heater assembly according to an embodiment.

Referring to FIG. 4, the heater assembly 110 may include a heating element 111 and a temperature sensor 115. However, the heater assembly 110 is not limited thereto, and may also further include other general-purpose elements in addition to the elements illustrated in FIG. 4. For example, the heater assembly 110 may further include a conducting wire connecting the temperature sensor 115 to the aerosol generating device 100.

The heating element 111 may extend in the longitudinal direction of the cigarette 200. The heating element 111 may be formed in an elongated structure extending in the longitudinal direction. A length of the heating element 111 extending in the longitudinal direction may be less than the total length of the cigarette 200 and may be less than a distance from a bottom surface of the accommodation space 120 to an opening of the accommodation space 120. Alternatively, the length of the heating element 111 may be greater than a length of the tobacco rod 210 included in the cigarette 200 but is not limited thereto.

The heating element 111 may include a hollow therein. Therefore, the heating element 111 may have an outer surface and an inner surface. In order to have a large hollow formed inside the heating element 111, a side surface of the heating element 111 formed between the outer surface and the inner surface of the heating element 111 may have a small thickness.

A cross-section of the heating element 111 cut along a plane orthogonal to a longitudinal direction may have various shapes. For example, a shape of the cross-section of the heating element 111 may be circular. When the cross-section of the heating element 111 and a cross-section of the cigarette 200 are circular, a diameter of the cross-section of the heating element 111 may be less than a diameter of the cross-section of the cigarette 200. However, a cross-section of the heating element 111 may have other shape than the circular cross-section, which is suitable for being inserted into the cigarette 200 and transferring heat to the tobacco rod 210.

The heating element 111 may include a ferromagnetic substance for generating heat by receiving an external magnetic field. The ferromagnetic substance may be a material that is magnetized in a direction of an external magnetic field and maintains a magnetic moment even after the external magnetic field disappears. As the ferromagnetic substance is included in the heating element 111, when the external magnetic field is applied to the heater assembly 110, the heater assembly 110 may heat the cigarette 200. For example, the ferromagnetic substance may include one of iron (Fe), nickel (Ni), and cobalt (Co), or an alloy including at least one thereof, but is not limited thereto.

The entire heating element 111 may be formed of a ferromagnetic substance. Alternatively, only a part of the heating element 111 may also be formed of a ferromagnetic substance. A proportion of a ferromagnetic substance contained in the heating element 111 may be appropriately selected within a range suitable for heating the cigarette 200.

When only a part of the heating element 111 is formed of a ferromagnetic substance, the ferromagnetic substance may be disposed at a position corresponding to the tobacco rod 210 of the cigarette 200 accommodated in the aerosol generating device 100. At least a part of the ferromagnetic substance may be disposed at a portion where the heating element 111 is in contact with the tobacco rod 210. Accordingly, the efficiency of heat transferred to the tobacco rod 210 and the efficiency of generating aerosol from the tobacco rod 210 may be increased.

The heating element 111 may be divided into detailed elements. For example, the heating element 111 may include an upper end portion 112, a middle portion 113, and a lower end portion 114. The upper end portion 112 may be located near an opening of the accommodation space 120 and may indicate a portion from an end of the heating element 111 facing the opening of the accommodation space 120 to a boundary between the upper end portion 112 and the middle portion 113. The lower end portion 114 may be located on an inner end portion of the accommodation space 120 and may indicate a portion from a bottom of the heating element 111 in contact with a bottom of the accommodation space 120 to a boundary between the lower end portion 114 and the middle portion 113. The middle portion 113 may be located between the upper end portion 112 and the lower end portion 114.

For example, when the cigarette 200 is accommodated in the aerosol generating device 100, the cigarette 200 may be accommodated up to the middle portion 113 of the heating element 111. Accordingly, a boundary between the lower end portion 114 and the middle portion 113 may be aligned with an end of the cigarette 200 which is accommodated in the aerosol generating device 100. In addition, the heater assembly 110 may further include a supporting body located at the lower end portion 114 so that the cigarette 200 may not be accommodated beyond the boundary between the lower end portion 114 and the middle portion 113.

The middle portion 113 of the heating element 111 may include a ferromagnetic substance. The middle portion 113 may be formed of a material corresponding to a ferromagnetic substance. Accordingly, the middle portion 113 may generate heat by receiving an external magnetic field. For example, the middle portion 113 may be positioned to come into contact with the tobacco rod 210 of the cigarette 200 accommodated in the aerosol generating device 100.

The upper end portion 112 may have a cross-section that becomes smaller toward an end facing an opening of the accommodation space 120. Specifically, the upper end portion 112 may have a conical shape or a poly pyramid shape that become narrower toward an end facing the opening. As such, the heater assembly 110 may be easily inserted into the cigarette 200.

According to an embodiment, as the heater assembly 110 of the aerosol generating device 100 includes a ferromagnetic substance for generating heat by receiving an external magnetic field, the cigarette 200 may not include a separate susceptor material. Therefore, a separate process for making a cigarette containing a susceptor material may not be required. Also, a cigarette used in an existing heating-type aerosol generating device may also be used in the aerosol generating device 100 according to the present disclosure, and thus, the aerosol generating device 100 may have high compatibility with existing cigarettes. In addition, since a separate susceptor material may not be included in the cigarette 200, a problem that aerosol is non-uniformly generated when the susceptor material is non-uniformly distributed in the cigarette may be solved.

As described above, since the heating element 111 is formed to include a hollow, a temperature of the heating element 111 increases may increase more rapidly compared with a case in which a hollow is not formed in the heating element 111. When the inside of the heater body 111 is not empty, the inside tends to heat earlier than a surface thereof, which delays heating of the surface. Thus, a temperature of the surface may increase faster when the inside is empty. The cigarette 200 is heated in contact with the surface of the heating element 111, and thus, when a hollow is formed inside the heating element 111, a speed at which the cigarette 200 is heated may be increased.

The temperature sensor 115 may measure a temperature of the heating element 111. The heater assembly 110 may include the heating element 111 and the temperature sensor 115, and the temperature of the heating element 111 may be measured by the temperature sensor 115, and thus, the temperature sensor 115 may directly measure the temperature of the heating element 111. Accordingly, the temperature at which the heating element 111 heats the cigarette 200 may be accurately reflected in the temperature measured by the temperature sensor 115.

When the heating element 111 further includes a hollow therein, the temperature sensor 115 may abut an inner surface of the heating element 111. The temperature sensor 115 in contact with the inner surface of the heating element 111 may be in direct contact with the heater assembly 110. Since the heating element 111 may have a hollow therein, a sufficient space for the temperature sensor 115 may be formed inside the heating element 111 and the temperature sensor 115 may be disposed on a hollow surface formed inside the heating element 111. As the temperature sensor 115 is disposed at a position in direct contact with the inner surface of the heating element 111, the temperature sensor 115 may not be contaminated by the tobacco rod 210 heated by being in contact with an outer surface of the heating element 111.

The temperature of the heating element 111 measured by the temperature sensor 115 may be provided to the controller 150 in the aerosol generating device 100. For example, the heater assembly 110 may further include a wire for connecting the temperature sensor 115 to the controller 150 and delivering the temperature measured by the temperature sensor 115.

Figure 6:
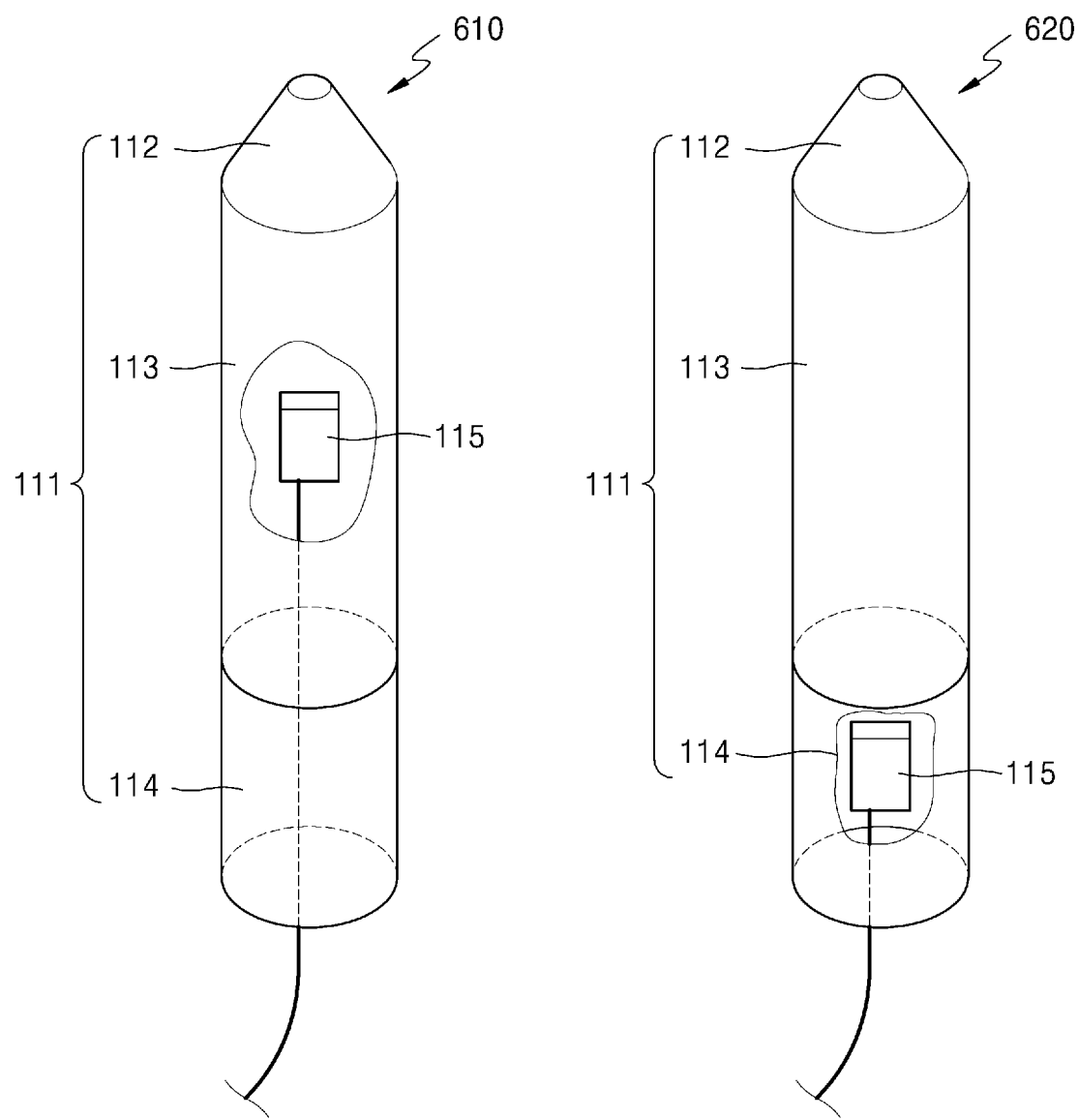
FIG. 6 shows views illustrating examples of a temperature sensor disposed at a position in direct contact with an inner surface of a heating element, according to embodiments.

The temperature sensor 115 may abut an inner surface of a ferromagnetic substance included in the heating element 111. The ferromagnetic substance may be disposed at a position corresponding to the tobacco rod 210, and may heat the tobacco rod 210 by receiving an external magnetic field. Thus, if the temperature sensor 115 is disposed at a position corresponding to the ferromagnetic substance, the temperature at which the tobacco rod 210 is heated may be measured more accurately. However, as illustrated in FIG. 6 below, the temperature sensor 115 may abut an inner surface of the heating element 111 other than the ferromagnetic substance portion.

The temperature of the heating element 111 is directly measured by the temperature sensor 115, and thus, the temperature of the heating element 111 may be precisely controlled. If the temperature sensor is not disposed at a position in direct contact with the susceptor material that heats by an external magnetic field, such as in a case where the susceptor material is included in a cigarette, it is difficult to accurately measure or control a temperature at which a cigarette is heated by a susceptor material. The heating element 111 according to the present disclosure is included in the heater assembly 110 of the aerosol generating device 100, not in the cigarette 200. Thus, a temperature of the heating element 111 may be accurately provided to the aerosol generating device 100 through the temperature sensor 115, and the temperature of the heating element 111 may be precisely controlled.

As described above, the temperature sensor 115 may be disposed at a position corresponding to a ferromagnetic substance, but is not limited thereto. The temperature sensor 115 may be disposed at various positions on the heating element 111. For example, the temperature sensor 115 may be disposed in the accommodation space 120 near the lower end portion 114 of the heating element 111. When the temperature sensor 115 is disposed in the accommodation space 120, the temperature sensor 115 may be configured with an infrared sensor that measures a temperature of the heating element 111 without coming into contact with the heating element 111, but is not limited thereto.

Figure 5:
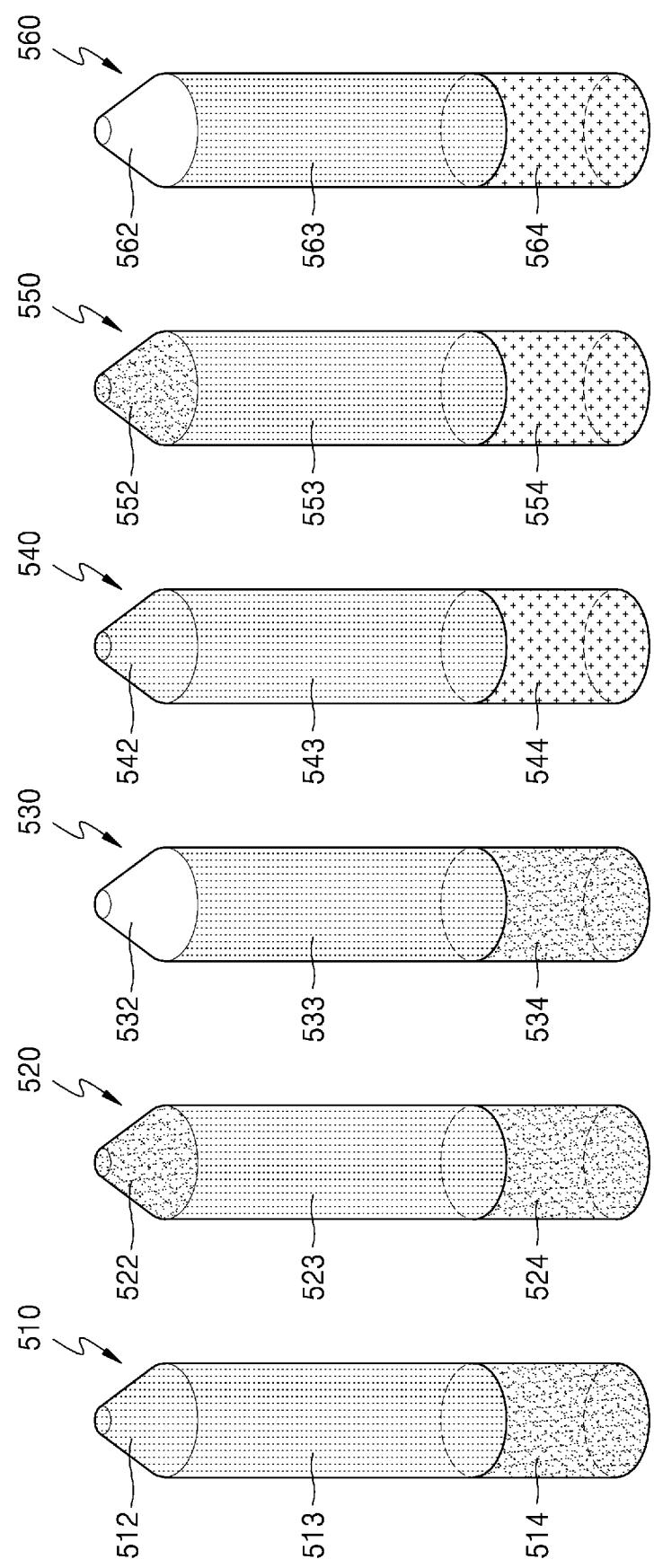
FIG. 5 shows views illustrating examples of a heating element further including at least one of a weak magnetic substance and a non-magnetic substance, according to embodiments.

FIG. 5 shows views illustrating a heating element further including at least one of a weak magnetic substance and a non-magnetic substance, according to an embodiment.

FIG. 5 illustrates various heating elements 111, each including the upper end portion 112, the middle portion 113, and the lower end portion 114. As described above, the heating element 111 may include a ferromagnetic substance.

The heating element 111 may further include at least one of a weak magnetic substance and a non-magnetic substance. The weak magnetic substance may refer to a material that generates heat by receiving an external magnetic field, which is weaker than heat generated by the ferromagnetic substance. The non-magnetic substance may refer to a material that does not generate heat by receiving an external magnetic field.

The weak magnetic substance may further include at least one of a paramagnetic substance and a diamagnetic substance. The paramagnetic substance may indicate a material that is partially magnetized in a direction of an external magnetic field. However, a magnetic moment may disappear when the external magnetic field disappears. The diamagnetic substance may indicate a material that is magnetized in a direction opposite to the external magnetic field. When the external magnetic field is applied to the heating element 111, heating of the paramagnetic substance and the antimagnetic substance may be weaker than heating of the ferromagnetic sub stance.

For example, the paramagnetic substance may indicate at least one of aluminum (Al), tin (Sn), platinum (Pt), and iridium (Ir), and the diamagnetic substance may indicate metal other than a transition metal, such as bismuth (Bi), lead (Pb), mercury (Hg), copper (Cu), graphite (C), gold (Au), and silver (Ag).

The middle portion 113 of the heating element 111 may be formed of a ferromagnetic substance. The lower end portion 114 of the heating element 111 may be formed of a weak magnetic substance or a non-magnetic substance. The upper end portion 112 of the heating element 111 may be formed of a ferromagnetic substance, a weak magnetic substance, or a non-magnetic substance.

The ferromagnetic substance may serve as a main heating portion for heating the cigarette 200. The paramagnetic substance may serve as an auxiliary heating portion for performing auxiliary heating of the cigarette 200. A diamagnetic substance does not heat the cigarette 200, but may support the heating element 111 or secure a length of the heating element 111.

In the case of a heating element 510 and a heating element 520, an upper end portion 512, a middle portion 513, and a middle portion 523 may be formed of a ferromagnetic substance to become a main heating portion, and a lower end portion 514, an upper end portion 522, and a lower end portion 524 may be formed of a paramagnetic substance to become an auxiliary heating portion. When the cigarette 200 is accommodated in the aerosol generating device 100, the heating element 510 and the heating element 520 may have a size suitable for contacting the tobacco rod 210.

In the case of a heating element 530, the middle portion 533 may be formed of a ferromagnetic substance to become a main heating portion, a lower end portion 534 may be formed of a paramagnetic substance to become an auxiliary heating portion, and an upper end portion 532 may be formed of a diamagnetic substance. When the cigarette 200 is accommodated in the aerosol generating device 100, the middle portion 533 and the lower end portion 534 come into contact with the tobacco rod 210, and a size of the heating element 530 may be set so that the lower end portion 534 is located at the filter rod 220.

In the case of a heating element 540, a heating element 550, and a heating element 560, lower end portions 544, 554, and 564 may be formed of a non-magnetic substance, and middle portions 543, 553, and 563 may be formed of a ferromagnetic substance. Upper end portions 542, 552, and 562 may be formed of a ferromagnetic substance, a paramagnetic substance, and a non-magnetic substance, respectively. Portions formed of the ferromagnetic substance and the paramagnetic substance may generate heat by coming into contact with the tobacco rod 210.

The lower end portions 544, 554, and 564 may not come into contact with the tobacco rod 210. For example, supporting bodies may be disposed on side surfaces of the lower end portions 544, 554, and 564, and thus, the middle portions 543, 553, and 563 and the upper end portions 542 and 552 may come into contact with the tobacco rod 210. Alternatively, if the cigarette 200 further includes a front-end plug, the lower end portions 544, 554, and 564 may come into contact with the front-end plug, and the middle portions 543, 553, and 563 and the upper end portions 542 and 552 may come into contact with the tobacco rod 210.

FIG. 6 shows views illustrating a temperature sensor disposed at a position in direct contact with an inner surface of a heating element according to embodiments.

FIG. 6 illustrates a heater assembly 610 including the temperature sensor 115 disposed at a position in direct contact with an inner surface of the middle portion 113, and a heater assembly 620 including the temperature sensor 115 disposed at a position in direct contact with an inner surface of the lower end portion 114. The heating element 111 includes a hollow therein.

In the case of the heater assembly 610, the middle portion 113 may be formed of a ferromagnetic substance, and the temperature sensor 115 may be disposed at a position abutting the inner surface of the middle portion 113. Thus, a temperature at which the cigarette 200 is heated may be accurately reflected in a temperature measured by the temperature sensor 115.

In the case of the heater assembly 620, the middle portion 113 may be formed of a ferromagnetic substance, and the lower end portion 114 may be formed of a weak magnetic substance or a non-magnetic substance. The temperature sensor 115 may be disposed at a position abutting an inner surface of the lower end portion 114. When the lower end portion 114 is formed of a weak magnetic substance or a non-magnetic substance, a temperature of the lower end portion 114 may be lower than a temperature of the middle portion 113 formed of a ferromagnetic substance. However, the temperature of the lower end portion 114 may maintain a constant relationship with the temperature of the middle portion 113. Accordingly, the temperature at which the cigarette 200 is heated may be derived based on a relationship between the temperature of the lower end portion 114 and the temperature of the middle portion 113, which are measured by the temperature sensor 115.

Figure 7:
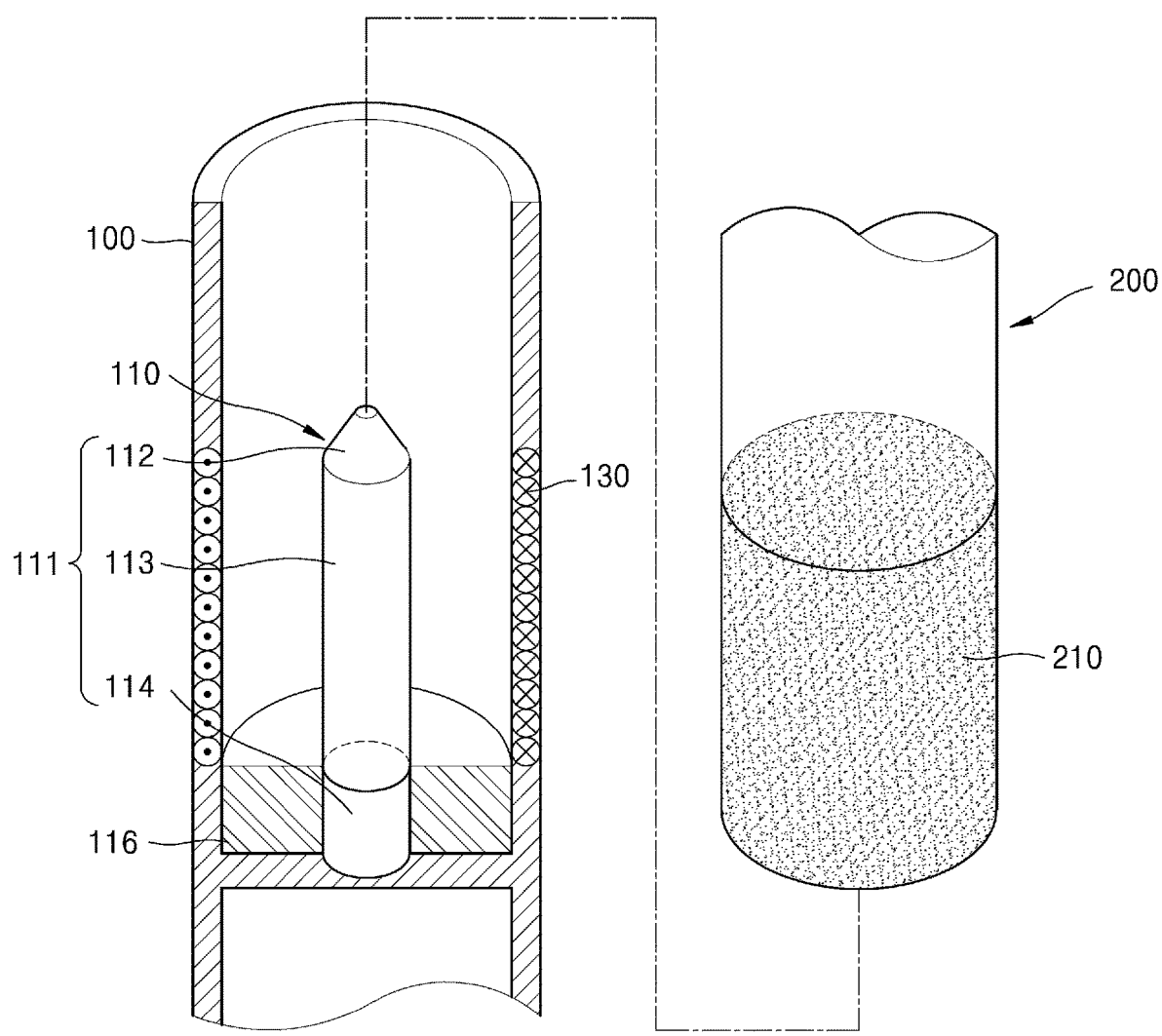
FIG. 7 is a view illustrating a heater assembly further including a supporting body and a coil disposed at a position corresponding to a ferromagnetic substance, according to an embodiment.

FIG. 7 is a view illustrating a heater assembly further including a supporting body and a coil disposed at a position corresponding to a ferromagnetic substance, according to an embodiment.

FIG. 7 illustrates a structure in which a heater assembly 110 further including a supporting body 116 and a coil 130 are disposed in the aerosol generating device 100 and the cigarette 200 is accommodated in the aerosol generating device 100. The heater assembly 110 may further include the supporting body 116 that is fixed to an outer surface of the heating element 111 and extends from the outer surface of the heating element 111 toward a side surface of the accommodation space 120.

The supporting body 116 may be fixed to the outer surface of the heating element 111. The supporting body 116 may surround the outer surface of the heating element 111. For example, the supporting body 116 may surround an outer surface of the lower end portion 114 of the heating element 111. However, the supporting body 116 is not limited thereto, and may also be disposed at the middle portion 113.

The supporting body 116 may have a ring shape or a donut shape that includes the heating element 111 in contact with its inner surface and extends outwards from the outer surface of the heating element 111. The supporting body 116 may extend from the outer surface of the heating element 111 to a side surface of the accommodation space 120 to be fitted in the accommodation space 120. Accordingly, the supporting body 116 and the heating element 111 may be supported and fixed inside the accommodation space 120. However, the supporting body 116 is not limited thereto, and may have another shape as long as the supporting body 116 may include the heating element 111 therein and may be accommodated in the accommodation space 120.

The supporting body 116 may be formed of a material having heat insulation and heat resistance. The supporting body 116 holds heating element 111, and thus, it may be heated by heat transferred from the heating element 111. Therefore, it is necessary for the supporting body 116 to have heat resistance so as not to be deformed or damaged by heat transferred from the heating element 111, and to have heat insulation so as not to transfer heat to the accommodation space 120 and the aerosol generating device 100.

For example, the supporting body 116 may be formed of at least one of polypropylene (PP), polyether ether ketone (PEEK), polyethylene (PE), polyimide, sulfone-based resin, fluorine-based resin, and aramid. The sulfone-based resin may include resins such as polyethyl sulfone and polyphenylene sulfide, and the fluorine-based resin may include polytetrafluoroethylene (Teflon).

The supporting body 116 may prevent tobacco residues generated from the cigarette 200 from flowing into the accommodation space 120 and the aerosol generating device 100. In addition, the supporting body 116 may prevent aerosol generated from the cigarette 200 from being liquefied again and flowing into the accommodation space 120 and the aerosol generating device 100.

The supporting body 116 may be made in a single body that includes the heating element 111 therein and is accommodated in the accommodation space 120. Alternatively, the supporting body 116 may be made of a structure that includes a flange in contact with the heating element 111 and a mold portion between the flange and a side surface of the accommodation space 120.

The coil 130 may be wound around a side surface of the accommodation space 120 to extend in a longitudinal direction. The coil 130 extending in the longitudinal direction may be disposed on the side surface of the accommodation space 120. The coil 130 may be disposed at a position corresponding to the heater assembly 110. The coil 130 may extend in a length direction to a length corresponding to the heater assembly 110 and may be disposed at a position corresponding to the heater assembly 110.

The coil 130 may be disposed at a position corresponding to a ferromagnetic substance included in the heating element 111. For example, when the middle portion 113 of the heating element 111 is formed of a ferromagnetic substance and the upper end portion 112 and the lower end portion 114 are formed of a diamagnetic substance, the coil 130 may be disposed at a position corresponding to the middle portion 113. Alternatively, when the upper end portion 112 and the middle portion 113 are formed of a ferromagnetic substance, the coil 130 may be disposed at a position corresponding to the upper end portion 112 and the middle portion 113.

As illustrated in FIG. 7, when the supporting body 116 is disposed at the lower end portion 114 and the middle portion 113 is formed of a ferromagnetic substance, the middle portion 113, the tobacco rod 210, and the coil 130 may be disposed at positions corresponding to each other. The middle portion 113 may be formed to have a length corresponding to a length of the tobacco rod 210, and the coil 130 may be disposed to have a length corresponding to the length of the middle portion 113. When the lengths of the middle portion 113, the tobacco rod 210, and the coil 130 correspond to each other, energy loss may be minimized during a process in which heat is generated from the middle portion 113 by the coil 130 and the tobacco rod is heated by the middle portion 113. Accordingly, power required for the aerosol generating device 100 to generate aerosol from the cigarette 200 may be reduced.

Figure 8:
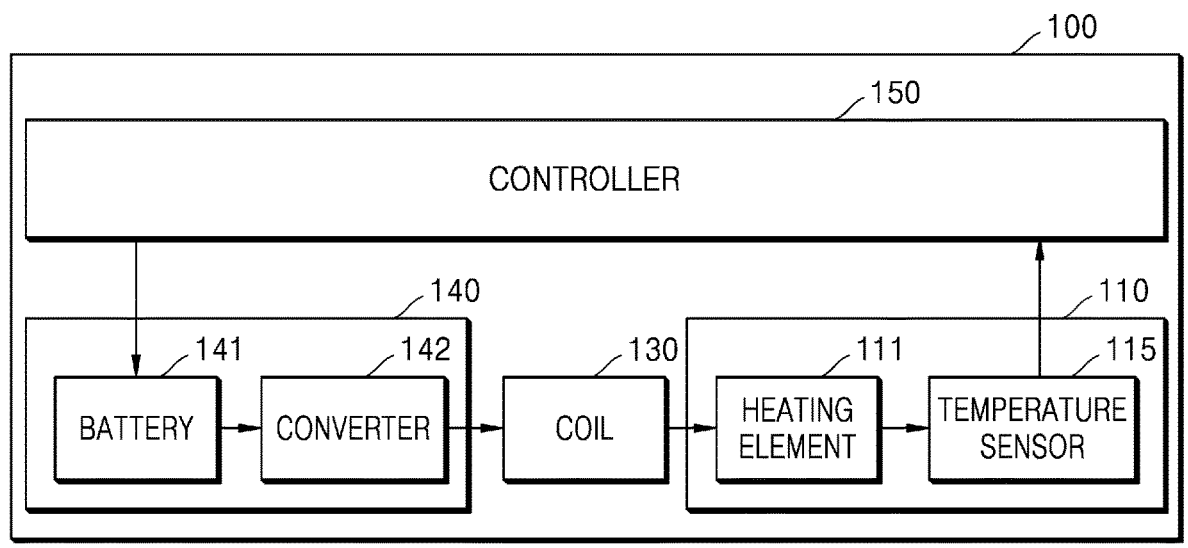
FIG. 8 is a diagram illustrating a process of controlling a temperature of a heater assembly according to an embodiment.

FIG. 8 is a diagram illustrating a process of controlling a temperature of a heater assembly according to an embodiment.

Referring to FIG. 8, the aerosol generating device 100 may include the heater assembly 110, the accommodation space 120, the coil 130, the power supply unit 140, and the controller 150. The heater assembly 110 may include the heating element 111 and the temperature sensor 115, and the power supply unit 140 may include a battery 141 and a converter 142. However, other general-purpose elements other than the elements illustrated in FIG. 8 may be further included in the aerosol generating device 100, the heater assembly 110, or the power supply unit 140.

The power supply unit 140 may supply power to the aerosol generating device 100. The power supply unit 140 may supply power to the coil 130. The power supply unit 140 may include the battery 141 for supplying a direct current to the aerosol generating device 100 and the converter 142 for converting the direct current supplied from the battery into an alternating current supplied to the coil 130.

The converter 142 may include a low-pass filter for filtering a direct current supplied from the battery 141 to output an alternating current to be supplied to the coil 130. The converter 142 may further include an amplifier for amplifying a direct current supplied from the battery 141. For example, the converter 142 may be a class-D amplifier that includes a load network constituting a low-pass filter and further includes an amplifier. When the converter 142 is a class-D amplifier, the coil 130 may be an inductor included in the load network of the class-D amplifier.

The controller 150 may be configured with an array of multiple logic gates or may be configured with a combination of a general-purpose microprocessor and a memory in which a program executable in the microprocessor is stored. In addition, the controller 150 may be configured with a plurality of processing elements.

The controller 150 may control power supplied from the power supply unit 140 to the coil 130. The controller 150 may control a direct current supplied from the battery 141 to generate a DC pulse. For example, the controller 150 may generate the DC pulse by controlling a switch connected to the battery 141 to be turned on-off.

The converter 142 may convert a DC pulse generated from the battery 141 into an alternating current. For example, a low-pass filter included in the converter 142 may receive a DC pulse and may output an alternating current by removing frequencies exceeding a cutoff frequency among a plurality of frequencies included in the DC pulse.

An alternating current may be transferred from the power supply unit 140 to the coil 130. When an alternating current is applied to the coil 130, the coil 130 may generate an alternating magnetic field. When the alternating magnetic field generated from the coil 130 is applied to the heater assembly 110, the heating element 111 may generate heat, and the temperature sensor 115 may measure a temperature of the heating element 111.

The controller 150 may control a temperature of the heater assembly 110 based on the temperature of the heating element 111 which is measured by the temperature sensor 115. For example, the controller 150 may modulate a DC pulse generated from the battery 141 based on the temperature of the heating element 111. Furthermore, the controller 150 may compare the temperature of the heating element 111, which is measured by the temperature sensor 115, with a reference temperature, and may control the temperature of the heater assembly 110 based on a difference between the measured temperature of the heating element 111 and the reference temperature.

The controller 150 may modulate a DC pulse generated from the battery 141 based on the temperature of the heating element 111. For example, the controller 150 may amplify the DC pulse through an amplifier included in the converter 142. When the DC pulse is amplified, an amplitude of an alternating current output from the converter 142 may increase. When the amplitude of the alternating current applied to the coil 130 increases, an amplitude of an alternating magnetic field generated from the coil 130 may increase, and accordingly, heat energy emitted from the heating element 111 may increase. Reversely, the controller 150 may reduce the intensity of the DC pulse to reduce the heat energy emitted from the heating element 111.

As another example, the controller 150 may perform a pulse width modulation on a DC pulse. When the DC pulse modulated by the pulse width modulation is input to the converter 142, a frequency of an alternating current output from the converter 142 may also be changed. Since the frequency of the alternating current applied to the coil 130 is changed, the frequency of the alternating magnetic field generated from the coil 130 may also be changed, and accordingly, the heat energy emitted from the heating element 111 may be changed. As such, a temperature of the heater assembly 110 may be controlled.

Specifically, the controller 150 may perform the pulse width modulation on a direct current supplied from the battery 141 by modulating at least one of a frequency of a DC pulse and a duty cycle of the DC pulse. The controller 150 may modulate a frequency or a duty cycle by adjusting a cycle of turning on and off a switch connected to the battery 141 or a ratio of turning on and off a switch. However, the frequency and duty cycle of the DC pulse is not limited thereto and may also be modulated by means other than the switch. Also, the controller 150 may perform the pulse width modulation by turning on and off the direct current of the battery 141, according to a section in which the pulse width modulation and a section for blocking the direct current supplied from the battery 141.

The controller 150 may compare a temperature of the heating element 111, which is measured by the temperature sensor 115, with a reference temperature. Also, the controller 150 may control a temperature of the heater assembly 110 based on a difference value between the measured temperature of the heating element 111 and a reference temperature. For example, when the temperature of the heating element 111 is higher than the reference temperature, the controller 150 may reduce at least one of a frequency and a duty cycle of a DC pulse supplied from the battery 141 or may reduce the intensity of the DC pulse.

In addition, the controller 150 may calculate the difference value between the measured temperature of the heating element 111 and the reference temperature, and may perform a feedback control by a PID method of adjusting the DC pulse supplied from the battery 141, based on at least one of a component proportional to the difference value, a component proportional to a value obtained by integrating the difference value, and a component proportional to a value obtained by differentiating the difference value.

The aerosol generating device 100 according to the present disclosure may directly measure a temperature of the heater assembly 110, and thus, a temperature of the heater assembly 110 for heating the cigarette 200 may be controlled based on the measured temperature of the heater assembly 110. Therefore, the temperature of the heater assembly 110 for heating the cigarette 200 may be precisely controlled and stably maintained, and the aerosol may be consistently generated from the cigarette 200 and provided to a user.

Although embodiments have been described in detail above, the scope of the present disclosure is not limited thereto, and various modifications and improvements of those skilled in the art using the basic concept of the present disclosure defined in the claims also belongs to the scope of the present disclosure.

What is claimed is:

1. A heater assembly for heating a cigarette accommodated in an aerosol generating device, comprising:
   a heating element that extends in a longitudinal direction of the cigarette and includes a ferromagnetic substance that generates heat by an external magnetic field; and
   a temperature sensor that measures a temperature of the heating element,
   wherein the heater assembly is disposed at an inner end portion of an accommodation space provided in the aerosol generating device to accommodate the cigarette,
   wherein the heating element further comprises a hollow, and
   wherein the temperature sensor is provided in the hollow of the heating element.

2. The heater assembly of claim 1, wherein the ferromagnetic substance is disposed at a position corresponding to a tobacco rod of the cigarette accommodated in the aerosol generating device.

3. The heater assembly of claim 1, wherein the temperature sensor abuts an inner surface of the heating element.

4. The heater assembly of claim 3, wherein the temperature sensor abuts an inner surface of the ferromagnetic substance included in the heating element.

5. The heater assembly of claim 3, wherein the temperature sensor abuts an inner surface of a section other than the ferromagnetic substance in the heating element.

6. The heater assembly of claim 1, wherein the heating element comprises:
   a lower end portion located at the inner end portion of the accommodation space;
   an upper end portion located at an opening of the accommodation space; and
   a middle portion located between the lower end portion and the upper end portion, and
   wherein the ferromagnetic substance is included in the middle portion.

7. The heater assembly of claim 6, wherein the lower end portion includes at least one of a weak magnetic substance and a non-magnetic substance.

8. The heater assembly of claim 6, wherein the upper end portion includes at least one of the ferromagnetic substance, a weak magnetic substance, and a non-magnetic substance.

9. The heater assembly of claim 6, wherein a cross-section of the upper end portion becomes smaller toward the opening.

10. An aerosol generating device comprising:
    a heater assembly configured to heat a cigarette accommodated in;
    an accommodation space of the aerosol generating device, the heater assembly comprising:
       a heating element that extends in a longitudinal direction of the cigarette and includes a ferromagnetic substance that generates heat by an external magnetic field, and
       a temperature sensor that measures a temperature of the heating element;
    a coil that applies an alternating magnetic field to the heating element;
    a power supply unit that supplies power to the coil; and
    a controller that controls the power supplied to the coil,
    wherein the heater assembly is disposed at an inner end portion of the accommodation space, and
    wherein the controller controls an amplitude of an alternating current applied to the coil by amplifying a direct current supplied from a battery.

11. The aerosol generating device of claim 10, wherein the coil is wound around a side surface of the accommodation space, extends in the longitudinal direction, and is disposed at a position corresponding to the ferromagnetic substance.

12. The aerosol generating device of claim 10, wherein the power supply unit comprises:
    the battery that supplies the direct current to the aerosol generating device; and
    a converter that converts the direct current supplied from the battery into the alternating current applied to the coil.

13. The aerosol generating device of claim 12, wherein the controller controls a frequency of the alternating current applied to the coil by performing a pulse width modulation on the direct current supplied from the battery.

14. The aerosol generating device of claim 13, wherein the controller performs the pulse width modulation by controlling at least one of a frequency of a pulse obtained from the direct current supplied from the battery, a duty cycle of the pulse, and on-off of the direct current supplied from the battery.

* * * * *